US012736145B2

(12) United States Patent
Reukers et al.

(10) Patent No.: US 12,736,145 B2
(45) Date of Patent: Sep. 15, 2026

(54) ONE-WAY VALVES

(71) Applicant: Quantum Servo Pumping Technologies Pty Ltd, Campbellfield (AU)

(72) Inventors: Darren Reukers, Melbourne (AU); John Mark Reyes, Melbourne (AU)

(73) Assignee: Quantum Servo Pumping Technologies Pty Ltd, Campbellfield (AU)

( * ) Notice: Subject to any disclaimer, the term of this patent is extended or adjusted under 35 U.S.C. 154(b) by 173 days.

(21) Appl. No.: 18/469,080

(22) Filed: Sep. 18, 2023

(65) Prior Publication Data

US 2024/0301960 A1 Sep. 12, 2024

(30) Foreign Application Priority Data

Mar. 8, 2023 (AU) ................................ 2023900632
Jun. 13, 2023 (AU) ................................ 2023901862

(51) Int. Cl.
*F16K 15/02* (2006.01)
*B24C 7/00* (2006.01)
(Continued)

(52) U.S. Cl.
CPC .......... *F16K 15/028* (2013.01); *B24C 7/0023* (2013.01); *F04B 19/04* (2013.01); *F04B 53/1032* (2013.01)

(58) Field of Classification Search
CPC ....................................................... F16K 15/02
(Continued)

(56) References Cited

U.S. PATENT DOCUMENTS 2,959,188 A * 11/1960 Kepner ................. F16K 15/044 251/363
3,457,949 A * 7/1969 Coulter ................. F16K 15/025 251/333

(Continued)

FOREIGN PATENT DOCUMENTS

KR 20200051935 A 5/2020
WO 2021007456 A1 1/2021

OTHER PUBLICATIONS

Australian Search Report and Written Opinion dated Apr. 21, 2023 for corresponding Australian Application No. 2023900632, filed Mar. 8, 2023.

*Primary Examiner* — Angelisa L. Hicks
(74) *Attorney, Agent, or Firm* — David D. Brush; Westman, Champlin & Koehler, P.A.

(57) ABSTRACT

A one-way valve includes an upstream portion, a movable element, a downstream portion, a bias and flow paths. The upstream portion includes an inlet and a first engaging portion about the inlet. The movable element includes a second engaging portion (engageable with the first engaging portion to impede reverse flow), openings and first bias-contacting portions. The downstream portion includes an outlet and second bias-contacting portions. The bias acts between the first bias-contacting portions and the second bias-contacting portions to urge the movable element against the valve seat and surrounds an interior open to the outlet. The flow paths are via the openings and from outside of the first engaging portion and to the interior, and passing inboard of an upstream end of the bias.

20 Claims, 4 Drawing Sheets

(51) Int. Cl.
*F04B 19/04* (2006.01)
*F04B 53/10* (2006.01)

(58) Field of Classification Search
USPC ............................................... 137/551, 551.2
See application file for complete search history.

(56) References Cited

U.S. PATENT DOCUMENTS 6,808,125 B2 * 10/2004 Ruthardt ................ F02M 61/12 239/89
6,823,893 B2 * 11/2004 Hebmuller ............ F16K 15/023 137/533.17
11,572,960 B2 * 2/2023 Guillou ............... F16K 17/0433
2014/0116217 A1 * 5/2014 Hashish .................... B26F 1/26 83/177
2016/0312902 A1 10/2016 Miyake et al.
2023/0008417 A1 1/2023 Bielen et al.

* cited by examiner

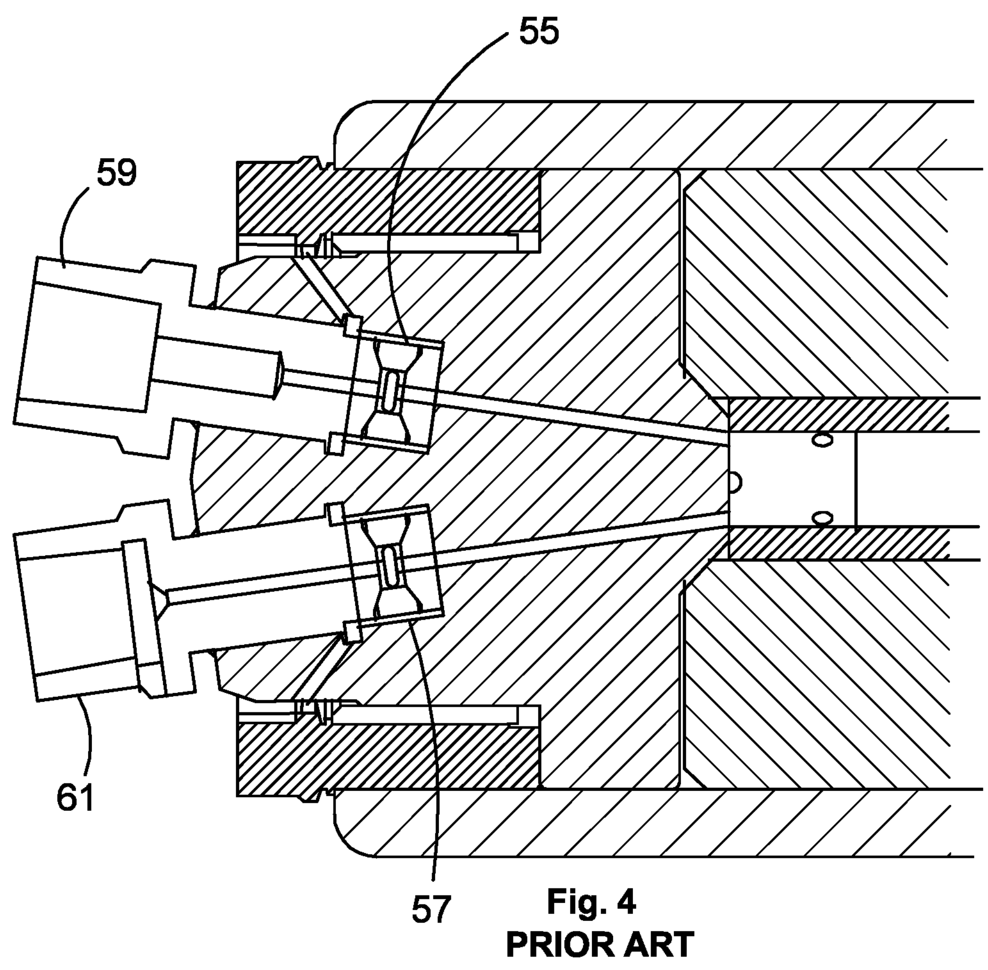
Fig. 4
PRIOR ART
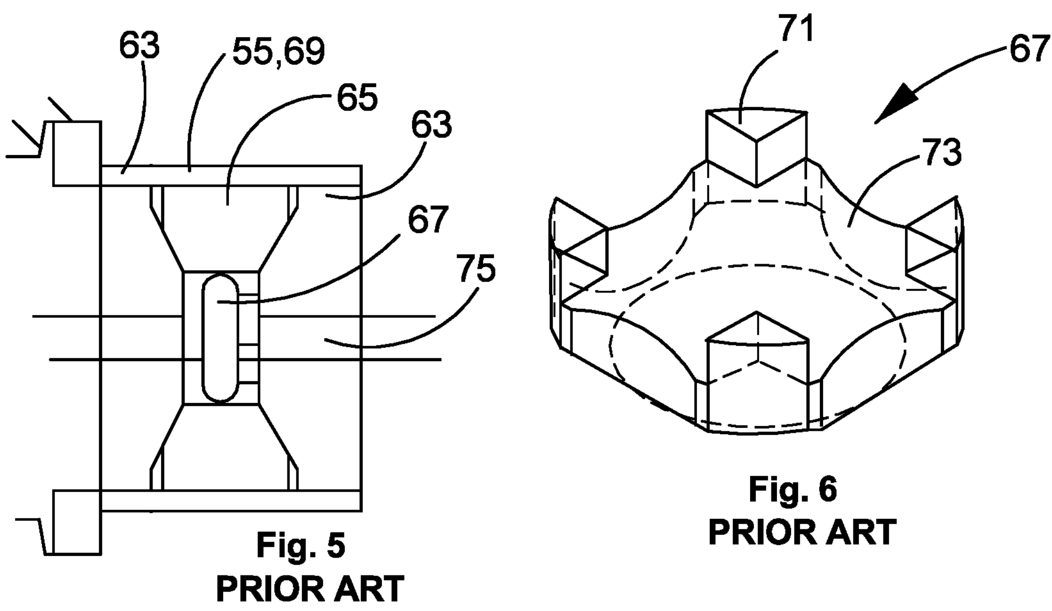
Fig. 5
PRIOR ART
Fig. 6
PRIOR ART

ONE-WAY VALVES

FIELD OF THE INVENTION

The invention relates to one-way valves and apparatus comprising one-way valves.

The invention will be described with reference to waterjet cutting by way of example only. Other examples of the technology disclosed herein may suit other applications.

BACKGROUND

FIG. 1 schematically illustrates a waterjet cutting apparatus 1 incorporating a pump 3 (for pumping water from an inlet 5 to an outlet 7), an attenuator 9 and a cutting head 11.

The pump 3 incorporates a linear actuator 13 each end of which is coupled to a respective pumping chamber 15, 17. The actuator displaces plungers to vary the volume of the pumping chambers. Inlet passage 19 (equipped with low-pressure check valve 21) and outlet passage 23 (equipped with high-pressure check valve 25) service the pumping chamber 15. The pumping chamber 17 is serviced by similar passages.

The linear actuator 13 includes a ball screw incorporating a screw 27 and driven by a servo motor having a stator concentric to the screw. In operation, the screw 27 is stroked at a rate in the vicinity of 60 to 120 strokes per minute (corresponding to 30 to 60 cycles per minute). With each reversal of the screw 27, two of the check valves open whilst the other two of the four check valves close. Pressures in the vicinity of 50,000 psi to 100,000 psi inclusive are routinely used for waterjet cutting. As such, the check valves are subjected to extreme cyclical loads.

It is of course desirable that the check valves be durable to withstand the cyclical loads. It is also desirable that the valves resist flow as little as is possible and be responsive so as to shut off quickly when the stroke of the pump is reversed. As such, the design constraints and considerations applicable to valves to suit waterjet cutting (and similar cylindrical ultra-high-pressure applications) are far removed from the design considerations for other valves that might be employed in the context of lower pressures and lower cycle rates.

FIG. 2 is a cross-section view through a head of a pump of the type illustrated in FIG. 1. It comprises a high-pressure check valve 29 and a low-pressure check valve 31. The valve 31 comprises a movable element 33 captured between an upstream portion 35 and a downstream portion 43.

The upstream portion 35 comprises a planar face 37 and an inlet 39 opening through the face 37. The movable element includes a planar face 41 that engages the face 37 to close the inlet 39. The downstream portion 43 comprises an outlet 45 opening through the centre of a short circular boss the exterior of which constitutes a seat 47 upon which spring 49 is seated.

The downstream end of the movable element 33 comprises a spring seat 51, akin to the seat 47, upon which the other end of the spring 49 is seated. The spring 49 is a compression spring and constitutes a bias biasing the movable element 33 to engage the face 37 to close the inlet 39 (that is, to bias the movable element to the position illustrated in FIG. 3). When the illustrated end of the pump is on its intake stroke, the plunger retracts, to drop the pressure in the chamber 53 and to in turn move the element 33 away from the face 37 and against the bias of the spring 49, to open the inlet 39. Fluid flows in through the inlet 39 and then flows outwardly about the element 33 before flowing back inwardly, between the convolutions of the spring 49, to the interior of the spring 49 en route to the outlet 45.

The present inventors have recognised that valves of this type can make violin-like noises in operation and fail from time to time. The present inventors have also recognised that replacing a valve of this type is laborious in that the parts to the left (as drawn in FIG. 2) must be removed to access the valve and components that make up the valve are fiddly and easily misassembled and/or lost.

Since early 2022, the initial applicant has supplied certain customers with pumps incorporating innovative features illustrated in FIGS. 4 to 6 that go some way to addressing some of these problems.

The pump head of FIG. 4 incorporates a pair of mutually identical one-way valves 55, 57. The valve 55, 57 are clamped in place at the end of threaded bores by threaded retainers 59, 61. The valve 55 comprises a pair of mutually identical end members 63 sandwiching a middle ring member 65 to enclose a movable element 67. Components 63, 65, 67 are encased in sleeve 69. FIG. 6 is a perspective view of the downstream side of the movable element 67. It comprises four standoffs 71 projecting from face 73. The standoff 71 engage the downstream member 63 when the valve is open to hold the surface 73 clear of the member 63 to permit flow via outlet 75.

Whilst trials of the valves 55 have shown a number of advantages, some trials have demonstrated failures believed to be associated with the movable element 67 jamming within the side wall of its confinement, and the present inventors have also recognised that faster response times would be desirable.

One or more aspects of the present disclosure provides improvements, or at least alternatives, in and for one-way valves and associated technologies.

It is not admitted that any of the information in this patent specification is common general knowledge, or that the person skilled in the art could be reasonably expected to ascertain or understand it, regard it as relevant or combine it in any way before the priority date.

SUMMARY

One aspect of the disclosure provides a one-way valve comprising
- a housing; and
- within the housing a movable element, a bias and flow paths;
- wherein the housing comprises an upstream portion, a downstream portion and one or more side portions;
- the upstream portion comprises
  - an upstream inlet, and
  - a first engaging portion about the upstream inlet;
- the movable element comprising
  - a second engaging portion engageable with the first engaging portion to impede reverse flow,
  - openings, and
  - first bias-contacting portions;
- the downstream portion comprises
  - an downstream outlet, and
  - second bias-contacting portions;
- the bias
  - is configured to act between the first bias-contacting portions and the second bias-contacting portions to urge the movable element against the first engaging portion, and
  - surrounds an interior open to the downstream outlet;
- the flow paths are via the openings, and
are from outside of the first engaging portion, and
are to the interior, and
pass inboard of an upstream end of the bias; and
the movable element
is movable in a stroke-wise direction;
has an element length in the stroke-wise direction;
has an element width transverse to the stroke-wise direction; and
the element length is not more than the element width.

Preferably the element length is not more than 75%, e.g. not more than 50%, of the element width.

The movable element may comprise one or more contact portions arranged to contact the one or more side portions. Preferably the one or more contact portions are confined to a portion, of the element length, having a portion length in the stroke-wise direction not more than 50%, or more preferably not more than 30%, e.g. not more than 15% of the element width.

Optionally each of the openings is arranged to carry fluid obliquely inwards from an opening inlet to an opening outlet. Preferably each opening inlet spans at least 50%, or more preferably 75%, e.g. 90% of a respective outward distance
from a nearest portion of a notional stroke-wise projection of the second engaging portion,
to the one or more walls.

Preferably the first engaging portion and the second engaging portion are co-operable to define a sealing interface; and
a stroke-wise projection of the sealing interface has a cross-sectional area at least equal to, or more preferably at least 1.25 times, e.g. 1.5 times, a cross-sectional area of the upstream inlet.

The bias spans at least 90% of element width.

The upstream portion may be an upstream unit. The downstream portion may be a downstream unit. Preferably the valve comprises a middle unit sandwiched between, and in abutment with each of, the upstream unit and the downstream unit. Each of one or more, or preferably each, of the upstream unit, the downstream unit and the middle unit may be respective integral body. A sleeve may embrace the upstream unit, the downstream unit and the middle unit.

The bias may be a coil spring.

Another aspect of the disclosure provides a pump comprising a pumping chamber serviced by an inlet valve and an outlet valve;
wherein at least one of the inlet valve and the outlet valve is a one-way valve comprising
an upstream portion comprising
an upstream inlet, and
a first engaging portion about the upstream inlet;
a movable element comprising
a second engaging portion engageable with the first engaging portion to impede reverse flow,
openings, and
first bias-contacting portions;
a downstream portion comprising
a downstream outlet, and
second bias-contacting portions;
a bias
acting between the first bias-contacting portions and the second bias-contacting portions to urge the movable element against the first engaging portion, and
surrounding an interior open to the downstream outlet; and
flow paths
via the openings, and
from outside of the first engaging portion, and
to the interior, and
passing inboard of an upstream end of the bias.

The pump may be capable of delivering 345 MPa (50,000 psi), or more preferably 600 MPa (87,000 psi).

The pump may be configured to operate at at least 60 strokes per minute.

Another aspect of the disclosure provides a waterjet cutting apparatus comprising
a cutting head; and
a pump to supply the cutting head.

BRIEF DESCRIPTION OF DRAWINGS

FIG. 4 is a cross-section view of an end of a pump;

FIG. 5 is an enlargement of the low-pressure check valve of FIG. 4;

FIG. 6 is a perspective view of the movable element of the check valve of FIG. 5;

DETAILED DESCRIPTION

Figure 1:
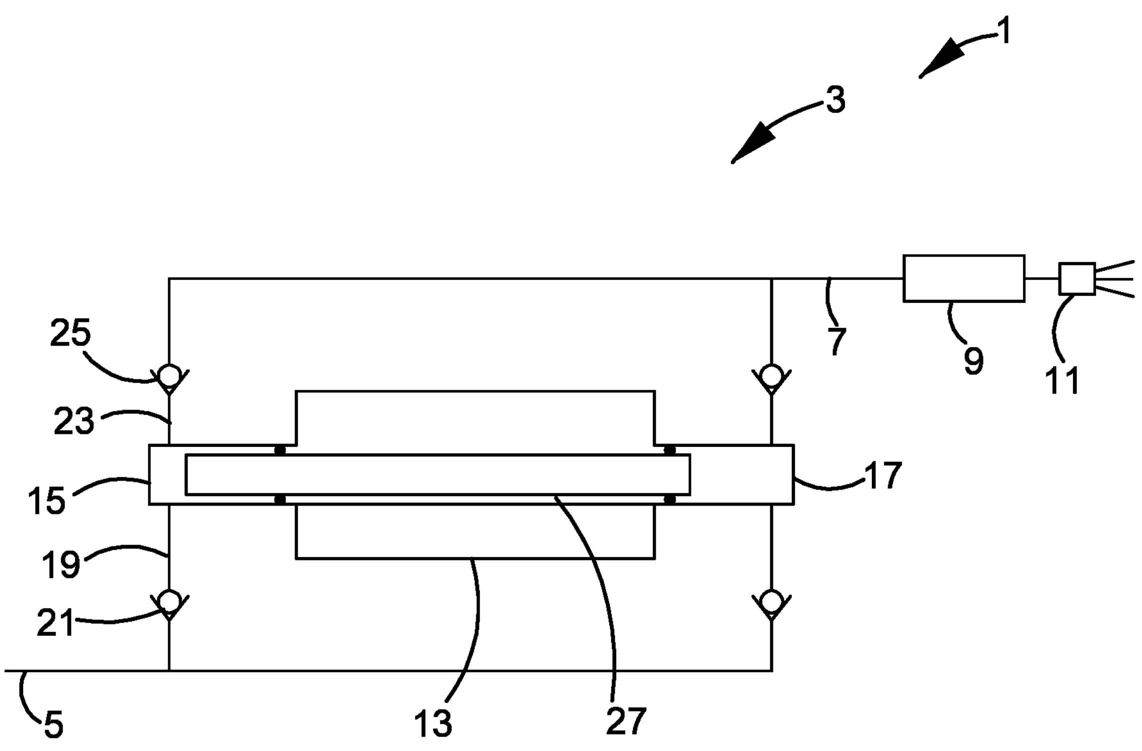
FIG. 1 schematically illustrates a waterjet cutting apparatus.
Figures 2, 3:
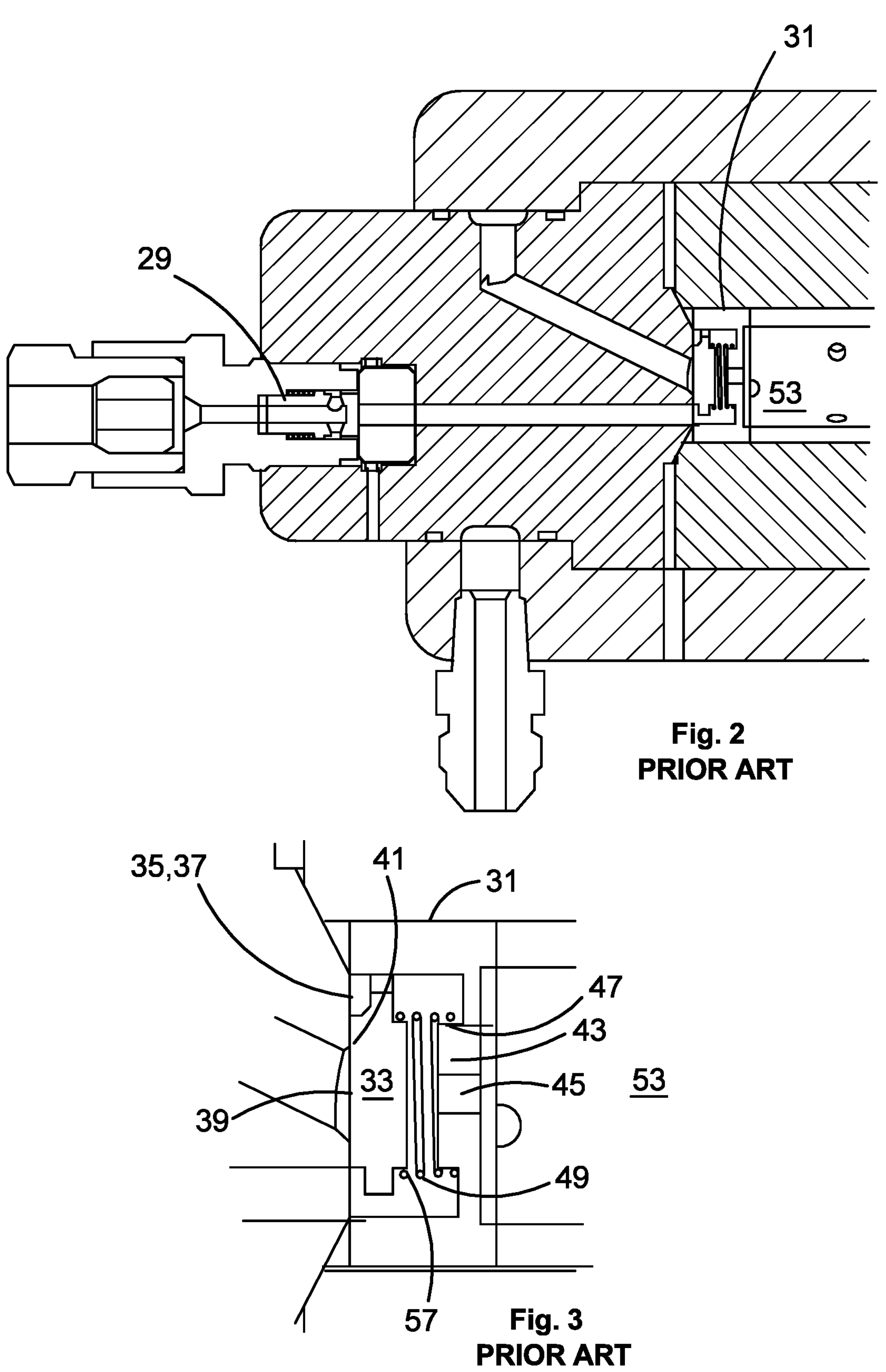
FIG. 2 is a cross-section view of a pumping head of a waterjet cutting apparatus.
FIG. 3 is an enlargement of the low-pressure check valve of the head of FIG. 2.

The valve 77 consists of six components, an upstream member 79, a downstream member 81, a middle member 83, a movable element 85, a spring 87 and a sleeve 89. Members 79, 81, 83 are pressed into the sleeve 87 and house components 85, 87 so that the six components are together a unit that can be handled as a convenient single piece. By way of example, if a valve were to fail, it might be replaced by simply unscrewing a retainer akin to retainer 59, removing the failed valve from the bore, dropping the valve 77 in place and reinstalling the retainer.

'Unitary' and similar terminology is used herein to refer to modes of construction that enable handling as a single piece. By way of example, two separate pieces of material may be unitised by mechanical fastening.

'Integral' and similar terminology is used herein in its conventional sense to refer to parts made of a single continuous body of material. As such, separate pieces of material can be integrated by welding but not by typical mechanical fastening.

Preferably, each of the six components is a respective unit and is most preferably a respective integral body.

The valve 77 is preferably a valve unit adapted to be clamped in place by retainer 59. According to the preferred mode of construction, a fit between the sleeve and the internal components holds the components of the valve unit together. Other modes of unitisation are possible. By way of example, the sleeve 87 might be eliminated and members 79, 81, 83 might instead threadingly engage with each other.

The upstream member 79 has a planar upstream face and a conical downstream face 95. The middle member 83 has a conical upstream face 97. The conical faces 95, 97, outwardly diverge at a shallow angle of divergence so that, when axially pressed (e.g. by tightening the retainer 59), high pressure at a narrow annular sealing interface between components 79, 83 is created to effect a seal. A similar sealing interface is formed between components 81, 83. In this way, the three ring-shaped members 79, 81, 83 are sealingly engaged with each other to define a valve housing. Other housing styles are possible. The member 83 is a side portion of the housing.

The upstream member 79 defines an inlet 91 and an engaging portion 93 inside the valve and surrounds the inlet 91. In this example, the engaging portion 93 is a planar annular face although more elaborate shapes are possible.

The movable element 85 comprises a circular planar upstream face 99, an outer annulus 101 of which constitutes an engaging portion for engaging the face 93 of upstream portion 71 to seal against reverse flow. The circular face 99 sits at the upstream end of a short cylindrical section 103 of the movable element 85. The section 103 is of lesser diameter than the cylindrical interior of the middle member 83 to define outboard space 105 outboard of the movable element 85. A skirt 107 projects downwardly from the cylindrical portion 103 at an oblique angle to a nose 109 dimensioned for a close sliding fit with the cylindrical interior of the middle unit 83, and to a spring seat 111. The spring seat 111 is an annular step facing radially outwards and in the downstream direction.

The skirt 107 is penetrated by an array of eight cylindrical openings 113 opening obliquely inwards to the inside of the movable element 85. In this example the openings are 1.2 mm in diameter.

The downstream element 81 comprises outlet 115 surrounded by spring seat 117 which, in this example, comprises an annular step facing upstream and radially outwards. A bias in the form of compression spring 119 engages in the spring seats 111, 117 to urge the movable element 85 in the upstream direction toward the flow-blocking position illustrated in FIG. 7.

Figures 7, 8:
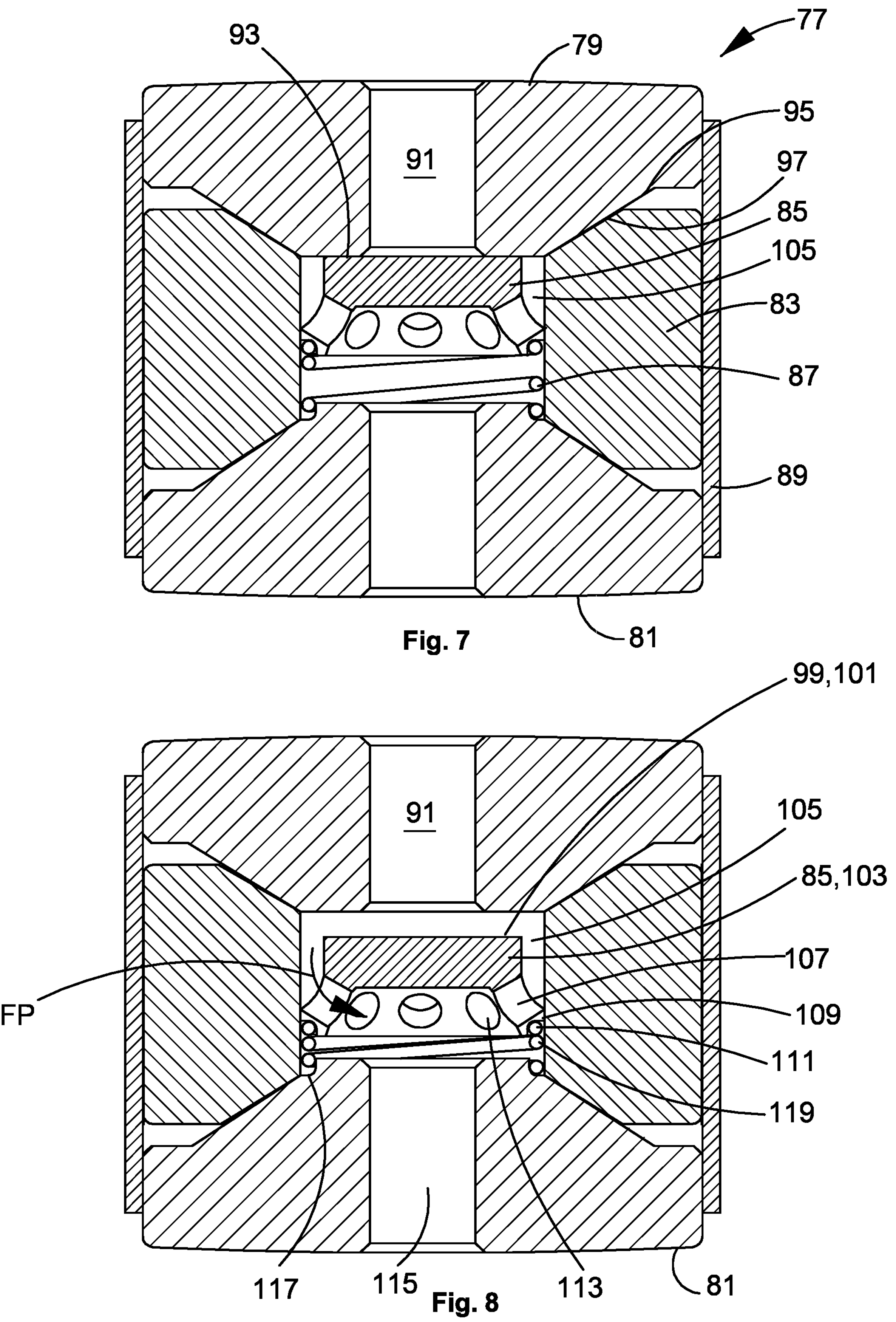
FIG. 7 is a cross-section view of a check valve in its closed position.
FIG. 8 is a cross-section view of the check valve of FIG. 7.

When a pressure differential is created across the valve to move the movable element 85 against the spring 119 to the flow permitting position of FIG. 8, the inlet 91 is opened to flow. Flow from the inlet 91 flows outwards over the face 99 to the space 105. From space 105 the fluid flows along flow paths FP including flowing obliquely inwards via the openings 107 to the interior of the spring 111 en route to the outlet 115. Preferred embodiments provide a path from the openings 107 to the outlet 115 unobstructed by the bias, e.g. unobstructed by windings of a coil spring.

The flow paths FP are arranged to direct the flow inboard of the spring seat 111 and into the interior of the spring 119. The nose 109 impedes fluid flow to the exterior of the spring 119. In this way, fluid flows downwardly through the centre of the spring without passing between adjacent convolutions of the spring. This gives designers freedom to select dense windings without impeding flow through the valve. Moreover the prototypes of the valve have performed efficiently without the violin-like noises associated with the valve 31. Noise is undesirable in and of itself and also because it is usually associated with wasted energy and part-life-reducing vibration.

Whilst the bias preferably takes the form of a coil spring such as a helical coil spring, in other examples, the spring might be replaced by a resilient sleeve. A stack of belleville washers is another possibility.

Whilst the openings 107 are oblique openings, in other implementations of the concept the openings might take other forms. By way of example, it is possible that a portion of the movable element sitting inside of the spring may have openings parallel to the spring. Alternatively, radially-directed openings may sit beyond the end of the spring. Whereas the openings 107 are offset from the edges the movable element 85, in other examples the movable element may comprise openings in the form of coves separating the spring seat 111 into a set of separate spring-contacting portions.

A small, lightweight, movable element is preferred to improve the speed at which the valve responds to changing pressure differentials. Having a short, bias-assisted, stroke also improves responsiveness. A preferred variant of the valve comprises an inlet diameter of 3 mm, and outlet diameter of 3 mm and a centre bore diameter of 7 mm and is suited to a pump capable of delivering 87,000 psi (600 MPa).

This example of the movable element has an outer diameter of 7 mm (toleranced for a sliding fit within the 7 mm central bore). The 7 mm diameter is the width of the element 85 as the word 'width' and similar wording is used herein. Whilst the element 85 is preferably round, other shapes are possible, in which case the width (as the wording is used herein) is a reference to the longest dimension transverse to the stroke-wise direction that might be measured with a vernier caliper.

The element 85 has a stroke-wise length of 3 mm. Again, 'length' as the wording is used herein is a reference to the longest dimension that might be measured in the relevant direction utilising a vernier caliper.

As such, the element has a L:W aspect ratio of about 1:2.3. A low aspect ratio is preferred to suit waterjet cutting apparatus. All else remaining equal, a lower aspect ratio is associated with a movable element of lower mass. Reducing the mass of the movable element enables the valve to close more swiftly and/or to reduce the impact energy against the valve seat for improved durability.

In this example, the nose 109 is arranged to contact the cylindrical side of the bore. This sliding contact guides the movable element as it is stroked back and forth in operation.

Whilst an interface between the nose 109 and the bore that is long in the stroke-wise direction would help to better align the element 85 within the bore, adding such length would increase the mass of the movable element 85. In this example, the nose 109 has a cylindrical exterior about 0.3 mm long in the stroke-wise direction.

Instead of a long guiding interface, the low aspect ratio movable element is supported by the spring 119 to guard against the movable element 85 turning (about an axis transverse to stroke-wise) and jamming within the bore. A bias configured to support the movable element all about its periphery (whether that support be a continuous ring of support or spaced points of support) is preferred. Biases having larger transverse dimensions, e.g. a transverse dimension at least 90% of the width of the movable element, are preferred. A short stroke length is another means to avoid jamming and to reduce the impact at the valve seat. Preferably, the stroke length in operation is not more than 30% of a width of the movable element. More preferably, it is not more than 20%, e.g. not more than 10%. In this example, the target stroke is about 0.5 mm and the spring is configured to reach solid state at about 0.8 mm.

The annulus 101 at which the movable element 85 contacts the upstream portion 91 corresponds to a sealing interface between components 85, 79. In this example, the sealing interface has an internal diameter of about 3.7 mm (corresponding to the 3 mm diameter of the inlet 91 plus the illustrated chamfer) and an outer diameter of 5.5 mm (corresponding to the outer diameter of the cylindrical upstream end of the movable element 85). As such, the sealing interface has a cross-sectional area more than 1.8 times the cross-sectional area of the Ø3 mm inlet 91. A larger contact area transverse to stroke-wise is preferred to spread the impact load and thereby prolong part life.

The sealing annulus is preferably planar, although other forms are possible, e.g. the interface may be conical or toroidal. Preferably each respective centre line through each of every potential radial cross-section of the interface is within the range of 70° to 110° (inclusive) of stroke-wise. By way of example, the sealing interface may be a conical interface within an included angle of 160°, corresponding to a centre line through a radial cross-section 80° from stroke-wise.

In the illustrated example, the skirt 107 is a conical flange that projects downwardly at an outward angle from vertical. Preferably, the angle is in the range of 15° to 45°. In this case it is 33°.

The openings 113 are each cylindrical and are each perpendicular to the conical surface. Each opening 113 is arranged to convey fluid from an approximately circular inlet opening inwards to an approximately circular opening outlet.

Preferably, the opening inlets do not extend beyond the conical exterior (e.g. do not extend into the cylindrical exterior of the forward portion of the movable element 85 in this case) to make for easier machining and deburring.

In this example, the inlet openings are dimensioned to span substantially all of a stroke-wise projection of an annular space defined by the cylindrical exterior of the forward portion of the movable element 85 and by the cylindrical interior of the bore. In this way, convenient cylindrical openings can be formed whilst achieving adequate inward flow rates.

The invention is not limited to the examples described herein. Rather the invention is defined by the claims.

The term 'comprises' and its grammatical variants has a meaning that is determined by the context in which it appears. Accordingly, the term should not be interpreted exhaustively unless the context dictates so. Likewise, the article 'a' or 'an' preceding an element does not exclude the presence of a plurality of such elements unless the context dictates so.

The invention claimed is:

1. A one-way valve comprising:
a housing; and
within the housing a movable element, a bias and flow paths;
wherein:
the housing comprises an upstream portion, a downstream portion and one or more side portions;
the upstream portion comprises
an upstream inlet, and
a first engaging portion about the upstream inlet;
the movable element comprising
a second engaging portion engageable with the first engaging portion to impede reverse flow, openings, and
first bias-contacting portions;
the downstream portion comprises
a downstream outlet, and
second bias-contacting portions;
the bias
is configured to act between the first bias-contacting portions and the second bias-contacting portions to urge the movable element against the first engaging portion, and surrounds an interior open to the downstream outlet;
the flow paths
are via the openings, and
are from outside of the first engaging portion, and
are to the interior, and
pass inboard of an upstream end of the bias; and
the movable element
is movable in a stroke-wise direction;
has an element length in the stroke-wise direction;
has an element width transverse to the stroke-wise direction;
the element length is not more than the element width;
the first engaging portion and the second engaging portion are co-operable to define a sealing interface at which the movable element contacts the upstream portion; and
a stroke-wise projection of the sealing interface has a cross-sectional area at least equal to a cross-sectional area of the upstream inlet.

2. The one-way valve of claim 1 wherein the element length is not more than 75% of the element width.

3. The one-way valve of claim 1 wherein the movable element comprises one or more contact portions arranged to contact the one or more side portions;
the one or more contact portions are confined to a portion, of the element length, having a portion length in the stroke-wise direction not more than 50% of the element width.

4. The one-way valve of claim 3 wherein the portion length is not more than 15% of the element width.

5. The one-way valve of claim 4 wherein each opening inlet spans at least 75% of the respective outward distance.

6. The one-way valve of claim 1 wherein each respective opening of the openings is arranged to carry fluid obliquely inwards from a respective opening inlet to a respective opening outlet; and
each respective opening inlet spans at least 50% of a respective outward distance from a respective nearest portion of a notional stroke-wise projection of the second engaging portion,
to the one or more side portions.

7. The one-way valve of claim 1 wherein the stroke-wise projection of the sealing interface has a cross-sectional area at least 1.5 times a cross-sectional area of the upstream inlet.

8. The one-way valve of claim 1 wherein the bias spans at least 90% of element width.

9. The one-way valve of claim 1 wherein the upstream portion is an upstream unit;
the downstream portion is a downstream unit; and
the valve comprises a middle unit sandwiched between and in abutment with each of the upstream unit and the downstream unit.

10. The one-way valve of claim 9 wherein each of the upstream unit, the downstream unit and the middle unit is a respective integral body.

11. The one-way valve of claim 9 comprising a sleeve embracing the upstream unit, the downstream unit and the middle unit.

12. The one-way valve of claim 1 wherein the bias comprises a coil spring.

13. A pump comprising;
an inlet valve and an outlet valve; and
a pumping chamber serviced by the inlet valve and the outlet valve;
wherein at least one of the inlet valve and the outlet valve is a one-way valve comprising:
an upstream portion comprising
an upstream inlet, and
a first engaging portion about the upstream inlet;

a movable element comprising
a second engaging portion engageable with the first engaging portion to impede reverse flow,
openings, and
first bias-contacting portions;
a downstream portion comprising
a downstream outlet, and
second bias-contacting portions;
a bias
acting between the first bias-contacting portions and the second bias-contacting portions to urge the movable element against the first engaging portion, and surrounding an interior open to the downstream outlet; and
flow paths
via the openings, and
from outside of the first engaging portion, and
to the interior, and
passing inboard of an upstream end of the bias, and
wherein the pump is capable of delivering 345 MPa (50,000 psi).

14. The pump of claim 13 wherein the movable element:
is movable in a stroke-wise direction;
has an element length in the stroke-wise direction;
has an element width transverse to the stroke-wise direction; and
the element length is not more than the element width.

15. The pump of claim 13 being capable of delivering 600 MPa (87,000 psi).

16. The pump of claim 13 configured to operate at 60 or more strokes per minute.

17. The pump of claim 13 wherein the first engaging portion and the second engaging portion are co-operable to define a sealing interface at which the movable element contacts the upstream portion; and
a stroke-wise projection of the sealing interface has a cross-sectional area at least equal to a cross-sectional area of the upstream inlet.

18. A waterjet cutting apparatus comprising:
a cutting head; and
a pump to supply the cutting head;
wherein the pump comprises an inlet valve, an outlet valve and a pumping chamber serviced by the inlet valve and the outlet valve; and
at least one of the inlet valve and the outlet valve is a one-way valve comprising:
an upstream portion comprising
an upstream inlet, and
a first engaging portion about the upstream inlet;
a movable element comprising
a second engaging portion engageable with the first engaging portion to impede reverse flow,
openings, and
first bias-contacting portions;
a downstream portion comprising
a downstream outlet, and
second bias-contacting portions;
a bias
acting between the first bias-contacting portions and the second bias-contacting portions to urge the movable element against the first engaging portion, and surrounding an interior open to the downstream outlet; and
flow paths
via the openings, and
from outside of the first engaging portion, and
to the interior, and
passing inboard of an upstream end of the bias.

19. The waterjet cutting apparatus of claim 18 wherein the movable element:
is movable in a stroke-wise direction;
has an element length in the stroke-wise direction;
has an element width transverse to the stroke-wise direction; and
the element length is not more than the element width.

20. The waterjet cutting apparatus of claim 18 wherein the first engaging portion and the second engaging portion are co-operable to define a sealing interface at which the movable element contacts the upstream portion; and
a stroke-wise projection of the sealing interface has a cross-sectional area at least equal to a cross-sectional area of the upstream inlet.

* * * * *